United States Patent [19]
Katagiri

[11] Patent Number: 6,074,739
[45] Date of Patent: Jun. 13, 2000

[54] COLORED COMPOSITES EXHIBITING LONG AFTERGLOW CHARACTERISTICS AND COLORED ARTICLES EXHIBITING LONG AFTERGLOW CHARACTERISTICS

[76] Inventor: Noboru Katagiri, 763-46, Kamekubo, Oi-machi, Iruma-gun, Saitama 356, Japan

[21] Appl. No.: 08/894,838

[22] PCT Filed: Mar. 1, 1996

[86] PCT No.: PCT/JP96/00486

§ 371 Date: Jan. 16, 1998

§ 102(e) Date: Jan. 16, 1998

[87] PCT Pub. No.: WO96/26991

PCT Pub. Date: Jun. 9, 1996

[30] Foreign Application Priority Data

Mar. 1, 1995 [JP] Japan ................................. 7-065282
May 15, 1995 [JP] Japan ................................. 7-139943

[51] Int. Cl.$^7$ .................................................. B32B 5/16
[52] U.S. Cl. .................. 428/323; 428/207; 428/213; 428/220
[58] Field of Search .................. 428/323, 213, 428/207, 220, 187

[56] References Cited

U.S. PATENT DOCUMENTS

| | | |
|---|---|---|
| 4,631,445 | 12/1986 | Hase et al. .................. 313/467 |
| 4,745,286 | 5/1988 | Jones ................................. 250/459.1 |
| 5,116,533 | 5/1992 | Grandmont et al. .............. 252/301.36 |
| 5,415,911 | 5/1995 | Zampa et al. ............................ 428/40 |
| 5,472,737 | 12/1995 | Anders .................................. 427/137 |
| 5,529,615 | 6/1996 | Rendino et al. ..................... 106/19 B |
| 5,607,621 | 3/1997 | Ishihara et al. .................... 252/301.36 |
| 5,686,022 | 11/1997 | Murayama et al. ............... 252/51.4 R |
| 5,695,218 | 12/1997 | Nicosia .................................... 281/38 |
| 5,698,301 | 12/1997 | Yonetani ................................ 428/213 |
| 5,716,723 | 2/1998 | Van Cleef et al. .................... 428/690 |
| 5,811,174 | 9/1998 | Murakami .............................. 428/195 |
| 5,839,718 | 11/1998 | Hase et al. .......................... 252/301.4 |

OTHER PUBLICATIONS

Patent Abstracts of Japan, vol. 095, No. 008, Sep. 29, 1995.

Translation of the International Preliminary Examination Report for PCT/JP96/00486—1996.

*Primary Examiner*—Hoa T. Le
*Attorney, Agent, or Firm*—Burns, Doane, Swecker & Mathis, L.L.P.

[57] ABSTRACT

Disclosed are a composite exhibiting long afterglow characteristics comprising at least a phosphorescence layer and a coloration layer, wherein the phosphorescence layer contains a phosphor and binder and the coloration layer contains a colorant, phosphor and binder, and an article exhibiting long afterglow characteristics which has the composite exhibiting long afterglow characteristics on at least a part of the surface thereof.

21 Claims, 2 Drawing Sheets ated by sunlight or light from artificial
COLORED COMPOSITES EXHIBITING LONG AFTERGLOW CHARACTERISTICS AND COLORED ARTICLES EXHIBITING LONG AFTERGLOW CHARACTERISTICS

TECHNICAL FIELD

The present invention relates to composites exhibiting long afterglow characteristics, which can be in various colors and exhibit high phosphorescence luminance even if they are in a deep color such as red, green and black or in metallic color, and articles comprising the composites.

BACKGROUND ART

There have been known pigments that can emit phosphorescence visible in a dark place for relatively long time (afterglow) after irradi lighting and repeatedly show such characteristics. These pigments absorb light energy in a light place and emit phosphorescence in a dark place like charge and discharge of storage battery, and called as phosphorescent pigments. There have also been known luminous pigments that comprise a phosphorescent pigment and a radioactive substance such as tritium, $^{147}$Pm and $^{226}$Ra, where radioactive ray emitted by the radioactive substance stimulates the phosphorescent pigment to emit phosphorescence.

Such phosphorescent pigments and luminous pigments are currently used for various products utilizing their long afterglow characteristics, for example, switches, lights for carrying, articles for use in darkroom, handrails, luminous indications such as wall indications, guidance signs, escape tools, other phosphorescent indications such as phosphorescent safety marks, ornamental articles such as ash trays, earrings and tablecloths, printed matter, toys, stationery and the like. For example, as uses of the phosphorescent pigments, Japanese Patent Unexamined Publication No. Hei 4-51405 (JP-A-51405/92) discloses phosphorescent wall panels for escape corridor, Japanese Patent Unexamined Publication No. Hei 1-111075 (JP-A-111075/89) discloses phosphorescent fibers, Japanese Patent Unexamined Publication No. Hei 1-200388 (JP-A- 200388/89) discloses light emitting ropes, and Japanese Patent Unexamined Publication No. Hei 1-200389 (JP-A-200389/89) discloses phosphorescent sheets for indications.

Such products as mentioned above may be desired to be colored depending on their uses while maintaining the long afterglow characteristics.

However, when the conventional phosphorescent pigments are colored, their phosphorescence luminance is substantially reduced depending on color and color strength. For example, according to JIS K 5120, Commentary of Phosphorescent Pigments, Commentary p.5, "Commentary List: Drop of Phosphorescence Luminance of Phosphorescent Pigments by Coloration", the phosphorescence luminance of such pigments is reduced to, considering the luminance when not colored as 100%, 15.7% when colored in green (added amount: 3.6%), 14.1% when colored in reddish orange (added amount: 2.4%) or 5.1% when colored in red (added amount: 9.1%). Thus, reddish orange or red coloration reduces the phosphorescence luminance more significantly.

To solve the above problem, for example, Japanese Patent Unexamined Publication No. Hei 3-166269 (JP-A-166269/91) discloses colored phosphorescent pigments and luminous pigments comprising organic pigments. However, phosphorescence luminance of these colored phosphorescent pigments and luminous pigments is still quite low because their phosphorescence luminance is not enhanced, and their color variation has substantial limitation.

Nevertheless, as products and commercial needs are more diversified, articles exhibiting long afterglow characteristics with high phosphorescence luminance and being colored in various colors have been highly desired.

For example, articles exhibiting afterglow characteristics in metallic color such as gold and silver or in black have not been practically used yet, because phosphorescence cannot be obtained by a combination of phosphorescent pigment and metallic color pigment or black pigment. This is because a layer containing a metallic color pigment or black pigment exhibits poor light transmission and hence a phosphorescent pigment contained therein cannot store light energy.

By the way, phosphorescent phosphors exhibiting higher phosphorescence luminance compared to conventional phosphorescent pigments have been developed (Japanese Patent Unexamined Publication No. Hei 7-11250 (JP-A-11250/95)). However, these phosphorescent phosphors themselves still cannot solve the above problem. The reduction of phosphorescence caused by mixing with a colored pigment is still too high to substantially enable coloration in metallic color such as gold and silver or in black.

The present invention has been completed to solve these problems, and an object of the present invention is to provide a composite exhibiting long afterglow characteristics which can exhibit higher phosphorescence luminance and color tone comparable to conventional ones with respect to the colors conventionally used for coloration of such materials such as red and green, and an article utilizing such a composite exhibiting long afterglow characteristics.

Another object of the present invention is to provide a composite exhibiting long afterglow characteristics which is in a color conventionally impossible to be used for the coloration of such materials, for example, metallic color such as gold and silver, black or the like, and can exhibit sufficient phosphorescence luminance, and an article utilizing such a composite exhibiting long afterglow characteristics.

DESCRIPTION OF THE INVENTION

The present invention provides a composite exhibiting long afterglow characteristics comprising at least a phosphorescence layer and a coloration layer, wherein the phosphorescence layer contains a phosphor and binder and the coloration layer contains a colorant, phosphor and binder.

The present invention provides an article exhibiting long afterglow characteristics a part or all of which surface is composed of the above composite exhibiting long afterglow characteristics.

BEST MODE FOR CARRYING OUT THE INVENTION

Figure 1:
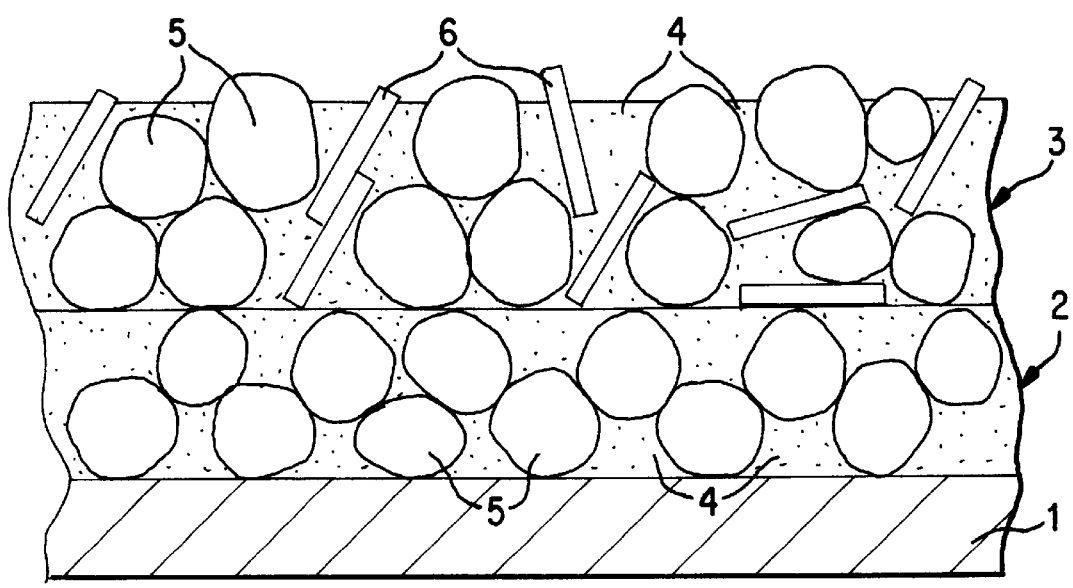
FIG. 1 is a sectional illustration of a colored composite exhibiting long afterglow characteristics according to the present invention.

The composite exhibiting long afterglow characteristics of the present invention is essentially characterized in that it comprises the phosphorescence layer and the coloration layer as independent layers. The phosphorescence layer is a layer containing phosphor and binder, and the coloration layer is a layer containing colorant, phosphor and binder.

Conventional products exhibiting long afterglow characteristics are composed only of a coloration layer containing a colorant and phosphor. In contrast, the composite exhibiting long afterglow characteristics of the present invention comprises the phosphorescence layer and the coloration layer mentioned above, and this characteristic enables higher phosphorescence luminance with comparable color tone, or coloration in a color which cannot have been compromised with the long afterglow characteristics while maintaining the long afterglow characteristics.

The phosphorescence layer is a layer containing a phosphor and binder.

The "phosphor" used in the present invention is a substance emitting phosphorescence, and any substance may be used so long as it has such a property. For example, phosphorescent pigments and luminous pigments fall within the meaning of "phosphor". The phosphorescent phosphors disclosed in Japanese Patent Unexamined Publication No. Hei 7-11250 (JP-A-11250/95) also fall within the meaning of the "phosphor" of the present invention.

While copper activated zinc sulfide (ZnS:Cu) is generally used as the "phosphor", other materials containing inorganic fluorescent pigments or organic fluorescent pigments and exhibiting long afterglow characteristics can also be selected. For example, zinc silicate phosphors, zinc sulfide cadmium phosphors, calcium sulfide phosphors, strontium sulfide phosphors, calcium tungstate phosphors and the like can be used. In particular, phosphorescent pigments containing strontium aluminate as base crystals and rare earth element as activator are preferred, because they exhibit high phosphorescence luminance.

On the other hand, the luminous pigment consists of a phosphorescent pigment which is added with a radioactive material so that the pigment should have spontaneous light-emitting property. For example, it consists of copper-activated zinc sulfide added with a radioactive material such as tritium and promethium 147 ("Pigment Handbook, Revised New Edition", pp.506-512, published Mar. 10, 1989, Seibundo Shinkosha Co., Ltd., edited by Japan Pigment Technology Association).

The "binder" used for the present invention may be any binder material so long as it can form a layer together with the phosphor. For example, it may be a resin-based material. The binder preferably has good transparency so that high phosphorescence luminance can be obtained. Examples of resins constituting the binder are, but not limited to, acrylic resins, alkyd resins, epoxy resins, urethane resins, acrylic silicone resins, silicone resins, fluorocarbon resins, melamine resins and the like.

Ratio of the phosphor and the binder and thickness of the phosphorescence layer may be suitably selected depending on phosphorescence luminance required for an objective composite exhibiting long afterglow characteristics. As the content of the phosphor in the phosphorescence layer increases, or as the thickness of the phosphorescence layer increases, phosphorescence luminance generally tends to become higher. However, when the content of the phosphor becomes too high, it may become difficult to form the phosphorescence layer or strength of the layer may be reduced. From such points of view, the content of the phosphor in the phosphorescence layer is suitably 50% by weight or more, preferably 70–95% by weight, more preferably 80–90% by weight. The thickness of the phosphorescence layer is in the range of, for example, 10–500 $\mu$m, practically in the range of 50–200 $\mu$m. Two or more phosphorescence layers may be used in order to obtain the phosphorescence layer of a large thickness.

The coloration layer is a layer containing a colorant, phosphor and binder.

The "phosphor" and the "binder" may be selected from those explained for the phosphorescence layer hereinabove.

As the colorant, those used for ordinary inks or paints can be used as they are. For example, they can be an inorganic or organic dye or pigment. Their color is not particularly limited.

In particular, according to the present invention, composites exhibiting long afterglow characteristics in metallic color or black can also be provided.

As a metallic color pigment, while ordinary metal powder and bronze powder may be used, deposited metal pigments in metallic color having scalelike particle shape are preferred, because they can afford high phosphorescence luminance. The deposited metal pigments are in the form of powdery flakes obtained by depositing metal (e.g., brass for golden color and aluminum for silver color) on a plastic piece or the like (polyethylene terephthalate film, aluminum etc.) and triturating the plastic piece or the like. The deposited metal is protected by a transparent (yellow) resin layer after the deposition. As a commercially available product, for example, ELGEE R Gold #325 (Oike Industry Co., Ltd) can be mentioned.

As a black pigment, while carbon black or the like can be used, deposited black pigments having scalelike particle shape are preferred, because they can afford high phosphorescence luminance. The deposited black pigments can be obtained in the same manner as in the preparation of the deposited metal pigments using black material instead of metal. As a commercially available product, for example, ELGEE R Black #325 (Oike Industry Co., Ltd) can be mentioned.

The above deposited metal pigments and the deposited black pigments are in the form of powdery flakes, and therefore they have an average diameter larger than that of usual pigments. Accordingly, by using the deposited metal pigments and the deposited black pigments, good light transmission in the coloration layer can be advantageously realized.

Content of the colorant and thickness of the coloration layer may be suitably selected depending on the desired color of the composite exhibiting long afterglow characteristics of the present invention. However, it should be taken into consideration that, as the content of the colorant and thickness of the coloration layer increase, phosphorescence luminance of the composite exhibiting long afterglow characteristics tends to be lowered.

The phosphor contained in the coloration layer affects phosphorescence luminance of the composite exhibiting long afterglow characteristics together with phosphorescence of the phosphorescence layer. In particular, in order to obtain high phosphorescence luminance, it is preferred that a single particle of the phosphor or a plurality of contiguous particles thereof are present over the whole thickness of the coloration layer. For example, by using, for the coloration layer, phosphor particles at least a part of which have a diameter larger than the thickness of the coloration layer, or phosphor particles having an average diameter larger than the thickness of the coloration layer, a single particle of the phosphor can be present over the whole thickness of the coloration layer. In order that a plurality of contiguous particles the phosphor should be present over the whole thickness of the coloration layer, it is necessary to use a content of the phosphor in the coloration layer higher than a certain level. For example, when the content of the phosphor in the coloration layer is 70–95% by weight, preferably 80–95% by weight, a plurality of contiguous particles of the phosphor can be present over the whole thickness of the coloration layer.

The above mentioned configurations of the particles of the phosphor will be further explained with reference to the appended FIGS. 1 and 2.

Figure 2:
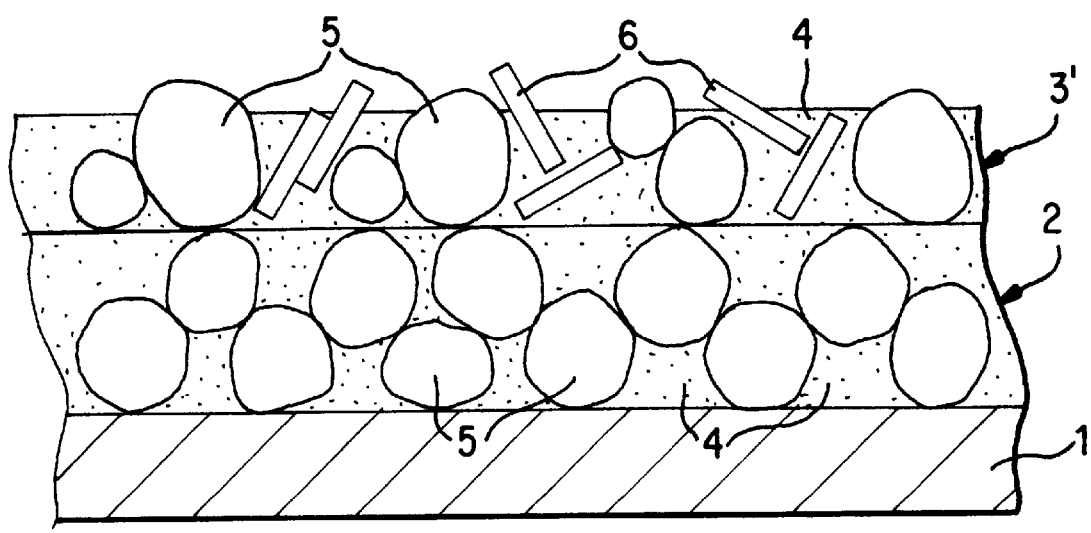
FIG. 2 is a sectional illustration of a colored composite exhibiting long afterglow characteristics according to the present invention.

Both of FIGS. 1 and 2 represent a cross-sectional view of the colored composite exhibiting long afterglow characteristics of the present invention, which comprises a substrate 1 on which the phosphorescence layer 2 and the coloration layer 3 are provided in this order. The phosphorescence layer 2 comprises the binder 4 and the phosphor 5. The coloration layer 3 comprises the binder 4, the phosphor 5 and the colorant 6 (deposited metal pigment in metallic color).

In FIG. 1, a plurality (2 or 3) of contiguous particles of phosphor 5 are together present over the whole thickness of the coloration layer 3. Each particle of the phosphor 5 is in contact with the adjacent particle. In FIG. 2, a single particle of phosphor 5 is a present over the whole thickness of the coloration layer 3. When the particles are in such configurations, light from the coloration layer 3 side (upper side of the Figure) easily transmits through the coloration layer 3 to the phosphorescence layer 2, and hence accumulation of light energy in the phosphor 5 in the phosphorescence layer 2 can be enhanced. In addition, phosphorescence emitted from the phosphorescence layer 2 easily transmits through the coloration layer 3 to the surface of the coloration layer 3, and hence the phosphorescence intensity becomes higher. Moreover, accumulation of light energy in the phosphor 5 of the coloration layer 3 and discharge thereof can also be promoted.

Because of the presence of the particles of phosphor 5 in the coloration layer 3, the deposited metal pigment 6 can be dispersed with proper spacing and hence it does not prevent transmission of the light to the phosphorescence layer 2 (excitation light) and the light from the phosphorescence layer 2 (phosphorescence).

While the coloration layer of the composite exhibiting long afterglow characteristics of the present invention can have only a single color, it may contain two or more portions with different colors so that some figures, patterns, characters, marks or the like can be formed.

The composite exhibiting long afterglow characteristics of the present invention may have an additional layer on at least a part of the surface of the phosphorescence layer and/or the coloration layer. Such an additional layer may be a substrate layer, and such a substrate layer may be substantially transparent or opaque with respect to visible light or it may be white.

The substrate layer may have a printing layer on at least one surface thereof. When the substrate layer is white or has a white printing layer, phosphorescence luminance can be improved. The substrate layer may be a sheet, film, card or the like composed of paper, plastics, cloth, glass, metal, ceramic, leather or the like.

The above additional layer may also be a protective layer. The protective layer is preferably substantially transparent as to visible light.

The present invention also provides an article exhibiting long afterglow characteristics which comprises the above composite exhibiting long afterglow characteristics on at least a part of its surface.

Kind of the article is not particularly limited. For example, it may be a switch, light for carrying, article for use in darkroom, handrail, luminous indication such as wall indication, guidance sign, escape tool, other phosphorescent indication such as phosphorescent safety mark, ornamental article such as ash tray, earring and tablecloth, printed matter, toy, stationery and the like.

When the article is one having a reversed image like decalcomania paper, the order of superimposition of the phosphorescence layer 2 and the coloration layer 3 is reversed.

Materials to be printed with such decalcomania paper may be various articles such as ceramic, cloth, plastics, metal, glass, enamel, building materials and the like.

Methods for preparing the composite exhibiting long afterglow characteristics and the article exhibiting long afterglow characteristics of the present invention will be explained hereinafter.

The composite exhibiting long afterglow characteristics of the present invention can be prepared by forming the phosphorescence layer and the coloration layer successively on a suitable substrate by a method commonly used for the preparation of coated membranes or films, for example, printing, coating or the like.

For example, the phosphorescence layer can be formed from an ink composed of a mixture containing a phosphor and medium containing binder. The coloration layer can be formed from an ink composed of a mixture containing colorant, phosphor and medium containing binder, or an ink composed of a mixture containing an ink containing colorant, phosphor and medium containing binder. The composition of the ink may be suitably decided considering the composition of intended layer, viscosity of the ink and the like. As the medium containing binder, a commercially available single-part or two-part type medium exhibiting good contact for various materials and good weather resistance can be suitably used. As an example of medium particularly suitable for cloth and exhibiting particularly excellent transparency, KDBDL (trade name), Matsui Coloring Matter Chemical Co., Ltd., can be mentioned.

An ink for forming the phosphorescence layer can be prepared by, for example, mixing 100 parts by weight of medium with 100–400 parts by weight, preferably 150–300 parts by weight of phosphor. An ink for forming the coloration layer can be prepared by, for example, mixing 100 parts by weight of medium with 100–400 parts by weight, preferably 150–300 parts by weight of phosphor and 1–15% by weight of ink containing coloring pigment.

In order to from a relatively thick layer to obtain high phosphorescence luminance, the layer is preferably formed by screen printing or the like. Depending on the shape of materials to be printed, flatbed screen printing, curved surface printing and roll-feed printing as well as electrostatic printing can be performed. ("Basic Printing Technology", pp.114–118, published Jan. 30, 1993, Sangyo Tosho Co., Ltd., edited by Takahiro Tsunoda et al.).

Mesh of screen used for the screen printing is not particularly limited, and it may be suitably decided considering diameters of coloring pigment and phosphor, viscosity of ink and the like. For example, a layer having a film thickness of about 10 $\mu$m to 100 $\mu$m can be formed by screen printing using screen fabric of 80 mesh to 200 mesh.

When the composite exhibiting long afterglow characteristics comprises no substrate (i.e., it comprises only the phosphorescence layer and the coloration layer), it can be obtained by forming the phosphorescence layer and the coloration layer on a suitable substrate and then peeling the formed composite exhibiting long afterglow characteristics from the substrate. When the composite exhibiting long afterglow characteristics of the present invention contains a substrate, phosphorescence layer and coloration layer, it can be obtained by forming the phosphorescence layer and the coloration layer successively on a suitable substrate.

The composite exhibiting long afterglow characteristics of the present invention may have a protective layer. Such a protective layer may be, for example, a UV curing resin layer. However, the protective layer is not limited to this. The composite exhibiting long afterglow characteristics of the present invention can have an adhesive layer.

The present invention will be further explained with reference to the following examples.

EXAMPLE 1

Ink for forming phosphorescence layer (1)

200 g of phosphorescent pigment (N Yako, phosphorescent pigment comprising strontium aluminate as base crystals and rare earth elements as activator, average diameter of 20 $\mu$m, Nemoto & Co., Ltd.) and 100 g of medium (Vinyl Screen Printing INK ATC 780N, solid content: 30% by weight, Seiko Advance Co., Ltd.) were mixed by sufficiently stirring them to afford Ink for forming phosphorescence layer (1).

Ink for Forming Coloration Layer (1)

160 g of phosphorescent pigment (N Yako, phosphorescent pigment comprising strontium aluminate as base crystals and rare earth elements as activator, average diameter of 20 $\mu$m, Nemoto & Co., Ltd.), 80 g of medium (Vinyl Screen Printing INK ATC 780N, solid content: 30% by weight, Seiko Advance Co., Ltd.) and coloration ink (Vinyl Screen Printing INK Red: ATC Weather-resistant 538 Process Red, solid content: 53.3% by weight, Seiko Advance Co., Ltd.) were mixed by sufficiently stirring them to afford Ink for forming coloration layer (1).

Preparation of Composite Exhibiting Long Afterglow Characteristics

The above Ink for forming phosphorescence layer (1) was screen printed on Yupo (thickness: 247 $\mu$m, Oji-Yuka Synthetic Paper Co., Ltd.) using printing fabric of T100 mesh to afford a phosphorescence layer having a size of 92×56 mm and thickness of 90 $\mu$m.

Subsequently, the above Ink for forming coloration layer (1) was screen printed on the above phosphorescence layer using printing fabric of T100 mesh to afford a coloration layer having a thickness of 82 $\mu$m.

Phosphorescence luminance of the resulting composite exhibiting long afterglow characteristics of the present invention was measured one minute after extinction.

Measurement of Luminance

A sample of composite whose energy had been sufficiently discharged in a dark place was irradiated by light from a 27 w fluorescent lamp corresponding to brightness of about 5400 lx for ten minutes. One minute after the completion of the light irradiation for light energy accumulation, phosphorescence intensity (afterglow) of the sample was measured using luminance photometer (LS-100, Minolta Co., Ltd.). Phosphorescence efficiency was calculated as intensity of phosphorescence (mcd) per unit amount (1 g) of the phosphorescent pigment contained in the composite exhibiting long afterglow characteristics.

Measurement of Color Tone

Color of the sample was visibly compared with DIC color reference and the closest DIC color reference number was determined. The results are shown in Table 1.

Comparative Example 1

Ink for forming coloration layer (1) prepared in Example 1 was screen printed on Yupo identical to that of Example 1 using printing fabric of T100 mesh (printed twice) to afford a coloration layer having a thickness of 157 $\mu$m.

Phosphorescence luminance one minute after extinction and color of the resulting printed matter were measured as in Example 1. The results are shown in Table 1.

TABLE 1

| | Example 1 | Comparative Example 1 |
|---|---|---|
| Phosphorescence layer | Phosphorescent pigment: 86 wt % Binder: 14 wt% Thickness: 90 $\mu$m | |
| Coloration layer | Phosphorescent pigment: 86.07 wt % Binder: 13.59 wt % Coloring pigment 0.34 wt % Thickness: 82 $\mu$m | Phosphorescent pigment: 86.07 wt % Binder: 13.59 wt % Coloring pigment 0.34 wt % Thickness: 157 $\mu$m |
| Luminance of afterglow (mcd/m$^2$) | 349 | 243 |
| Phosphorescence efficiency (mcd/g) | 1.52 | 1.25 |
| Color tone | | |
| Hue | Red | Red |
| DIC | #274 | #274 |

From the results shown in Table 1, it can be seen that the composite exhibiting long afterglow characteristics of the present invention exhibits higher afterglow luminance with the same color tone compared to the sample comprising only the coloration layer. It can also seen that it exhibits higher phosphorescence efficiency, i.e., the phosphor is utilized more efficiently for the emission of phosphorescence.

EXAMPLES 2–6

A phosphorescence layer having a thickness 90 $\mu$m was formed in the same manner as in Example 1. Subsequently, inks for forming coloration layer with various ratios of the phosphorescent pigment and the medium or ratios of the coloration ink and the medium were each screen printed on the phosphorescence layer in the same manner as in Example 1 to afford coloration layers (red).

Phosphorescence luminance one minute after extinction and color of the resulting composites exhibiting long afterglow characteristics of the present invention were measured as in Example 1. The results are shown in Table 2.

TABLE 2

| | Coloration layer | | | | | | |
|---|---|---|---|---|---|---|---|
| Example | Phosphorescent pigment (wt %) | Binder (wt %) | Coloration pigment (wt %) | Thickness ($\mu$m) | Luminance of afterglow (mcd/m$^2$) | Hue | DIC |
| 2 | 88.5 | 11.23 | 0.28 | 81 | 390 | Red | #275 |
| 3 | 90.20 | 9.56 | 0.24 | 109 | 394 | Red | #261 |
| 4 | 86.36 | 13.43 | 0.21 | 84 | 497 | Red | #261 |

TABLE 2-continued

| | Coloration layer | | | | | | |
|---|---|---|---|---|---|---|---|
| | Phosphorescent pigment | Binder | Coloration pigment | Thickness | Luminance of afterglow | Color tone | |
| Example | (wt %) | (wt %) | (wt %) | (μm) | (mcd/m$^2$) | Hue | DIC |
| 5 | 86.39 | 13.41 | 0.21 | 57 | 533 | Red | #261 |
| 6 | 86.19 | 13.53 | 0.28 | 53 | 438 | Red | #275 |

EXAMPLE 8

A phosphorescence layer having a thickness of 179 μm was formed as in Example 1 by applying the ink twice, and then a coloration layer was formed as in Example 1.

The resulting composite exhibiting long afterglow characteristics of the present invention exhibited luminance one minute after extinction of 596 mcd/m$^2$ and phosphorescence efficiency of 2.26 mcd/g, and, regarding color tone, it exhibited red hue corresponding to DIC #275.

Comparative Example 2 and 3

Ink for forming coloration layer (1) was applied once or three times as in Comparative Example 1 to afford a coloration layer of having a thickness of 90 μm or 220 μm.

Luminance one minute after extinction, phosphorescence efficiency and color tone of the resulting composites exhibiting long afterglow characteristics are shown in Table 3.

TABLE 3

| | Comparative Example 2 | Comparative Example 3 |
|---|---|---|
| Luminance of afterglow (mcd/m$^2$) | 208 | 235 |
| Phosphorescence efficiency (mcd/g) | 2.49 | 0.79 |
| Color tone | | |
| Hue | Red | Red |
| DIC | #261 | #295 |

EXAMPLES 9–11

A phosphorescence layer having a thickness 90 μm was formed in the same manner as Example 1. Subsequently, inks for forming coloration layer containing the following inks as coloration ink (content of coloration ink was 3% for Examples 9 and 10 and 10% for Example 11) were screen printed on the phosphorescence layer in the same manner as in Example 1 to form coloration layers.

Luminance one minute after extinction, phosphorescence efficiency and color tone of the resulting composites exhibiting long afterglow characteristics of the present invention are shown in Table 4.

Example 9 (blue): Coloration ink (Vinyl Screen Printing INK Blue: ATC Weather-resistant 546 Process Blue, solid content: 47.7% by weight, Seiko Advance Co., Ltd.)

Example 10 (green): Coloration ink (Vinyl Screen Printing INK Green: ATC 304 Process Green, solid content: 53.4% by weight, Seiko Advance Co., Ltd.)

Example 11 (gold): ELGEE R Gold #325, Oike Kogyo Co., Ltd.

TABLE 4

| | Example 9 | Example 10 | Example 11 |
|---|---|---|---|
| Luminance of afterglow (mcd/m$^2$) | 941 | 1305 | 405 |
| Phosphorescence Efficiency (mcd/g) | 4.54 | 6.13 | 2.01 |
| Color tone | | | |
| Hue | Blue | Green | Gold |
| DIC | #99 | #64 | #620 |

EXAMPLE 12

A protective layer having a thickness of 65 μm was formed using an ink for forming UV curing protective layer (Vinyl Screen Printing INK UV8414 Clear, Seiko Advance Co., Ltd.) on the coloration layer of the composite exhibiting long afterglow characteristics of the present invention obtained in Example 1.

Luminance one minute after extinction of the obtained composite exhibiting long afterglow characteristics of the present invention was 356 mcd/m$^2$, and, regarding color tone, it exhibited red hue corresponding to DIC #274.

EXAMPLE 13

Ink for Forming Phosphorescence Layer (2)

230 g of phosphorescent pigment (GSS, average diameter: 21 μm, Nemoto & Co., Ltd.), 100 g of medium (Vinyl Screen Printing INK VIC 800, Seiko Advance Co., Ltd.) and 20 g of cellosolve acetate were mixed by sufficiently stirring them to afford Ink for forming phosphorescence layer (2).

Ink for Forming Coloration Layer (2)

230 g of phosphorescent pigment (GSS, average diameter: 21 μm, Nemoto & Co., Ltd.), 100 g of medium (Vinyl Screen Printing INK VIC 800, Seiko Advance Co., Ltd.) and 3 g of coloration ink (Vinyl Screen Printing INK Green: ATC 304 Process Green, solid content: 53.4% by weight, Seiko Advance Co., Ltd.) were mixed by sufficiently stirring them to afford Ink for forming coloration layer (2).

Preparation of Composite Exhibiting Long Afterglow Characteristics

The above Ink for forming phosphorescence layer (2) was screen printed on Yupo (thickness: 247 μm, Oji-Yuka Synthetic Paper Co., Ltd.) using printing fabric of T100 mesh to afford a phosphorescence layer having a size of 92×56 mm. Subsequently, the above Ink for forming coloration layer (2) was screen printed on the above phosphorescence layer using printing fabric of T100 mesh to afford a coloration layer. The phosphorescence layer and the coloration layer had a total thickness of 101 μm.

Phosphorescence luminance one minute after extinction of the resulting composite exhibiting long afterglow characteristics of the present invention was 129 mcd/m$^2$.

Comparative Examples 4–6

Fluorescent printed layers were formed by coater printing using commercially available fluorescent pigment or fluorescent inks, and their phosphorescence luminance one minute after extinction (mcd/m$^2$) was measured. The results are shown in Table 5.

The inks used are shown below.

Comparative Example 4: Ink formed by mixing 10 g of luminous pigment (Kurachi Co., Ltd.) and 10 g of medium (Vinyl Screen Printing INK ATC 780N, solid content: 30% by weight, Seiko Advance Co., Ltd.)

Comparative Example 5: Color Luminous Paint Pink (Shinleuch Co., Ltd.)

Comparative Example 6: Color Luminous Paint Green (Shinleuch Co., Ltd.)

TABLE 5

|  | Example 13 | Comparative Example 4 | Comparative Example 5 | Comparative Example 6 |
|---|---|---|---|---|
| Luminance of afterglow (mcd/m$^2$) | 129 | 32 | 47 | 60 |
| Color torn | Green | Pale orange | Fluorescent red | Fluorescent green |

From the results shown in Table 5, it can be seen that the composite exhibiting long afterglow characteristics of the present invention exhibit higher afterglow luminance compared to the commercially available fluorescent paints even when GSS, conventional phosphor, was used.

I claim:

1. A composite exhibiting afterglow characteristics comprising at least a phosphorescence layer and a coloration layer, wherein the phosphorescence layer contains a phosphor and binder and the coloration layer contains a colorant, phosphor and binder.

2. The composite exhibiting afterglow characteristics of claim 1, wherein a single particle of the phosphor or a plurality of contiguous particles thereof contained in the coloration layer are present over the whole thickness of the coloration layer.

3. The composite exhibiting afterglow characteristics of claim 2, wherein at least a part of phosphor particles contained in the coloration layer have a diameter larger than the thickness of the coloration layer.

4. The composite exhibiting afterglow characteristics of claim 2, wherein the phosphor particles contained in the coloration layer have an average diameter larger than the thickness of the coloration layer.

5. The composite exhibiting afterglow characteristics of claim 1, wherein content of the phosphor in the coloration layer is 55–95% by weight.

6. The composite exhibiting afterglow characteristics of claim 1, wherein the colorant contained in the coloration layer is colored pigment.

7. The composite exhibiting afterglow characteristics of claim 6, wherein the colored pigment is metallic color pigment or black pigment.

8. The composite exhibiting afterglow characteristics of claim 7, wherein the metallic color pigment or the black pigment is in the form of scales.

9. The composite exhibiting afterglow characteristics of claim 1, wherein the phosphor contained in the phosphorescence layer is a phosphorescent pigment and/or luminous pigment.

10. the composite exhibiting afterglow characteristics of of claim 1, wherein the phosphor contained in the coloration layer is a phosphorescent pigment and/or luminous pigment.

11. The composite exhibiting afterglow characteristics of claim 1, wherein the binders contained in the phosphorescence layer and the coloration layer are substantially transparent with respect to visible light.

12. The composite exhibiting afterglow characteristics of claim 1, wherein the coloration layer comprises two or more portions in different colors.

13. The composite exhibiting afterglow characteristics of claim 1, wherein an additional layer is provided on at least a part of surface of at least one of the phosphorescence layer and the coloration layer.

14. The composite exhibiting afterglow characteristics of claim 13, wherein the additional layer is a substrate layer.

15. The composite exhibiting afterglow characteristics of claim 14, wherein the substrate layer is substantially transparent or opaque with respect to visible light or in white.

16. The composite exhibiting afterglow characteristics of claim 14, wherein the substrate has a printing layer on at least one surface thereof.

17. The composite exhibiting afterglow characteristics of claim 13, wherein the additional layer is a protective layer.

18. The composite exhibiting afterglow characteristics of claim 17, wherein the protective layer is substantially transparent with respect to visible light.

19. The composite exhibiting afterglow characteristics of claim 13, wherein the additional layer is an adhesive layer.

20. An article exhibiting afterglow characteristics which has the composite exhibiting afterglow characteristics of claim 1 on at least a part of the surface thereof.

21. The article exhibiting afterglow characteristics of claim 20, which is a luminous indication, guidance sign, escape tool, phosphorescent indication, ornamental article, printed matter, toy or stationery.

* * * * *